United States Patent [19]
Cook, Jr.

[11] Patent Number: 5,577,533
[45] Date of Patent: Nov. 26, 1996

[54] FLEXURED SHAFT POPPET

[76] Inventor: Joseph S. Cook, Jr., 15318 Bratten La., Webster, Tex. 77598

[21] Appl. No.: 305,240

[22] Filed: Sep. 13, 1994

[51] Int. Cl.⁶ ................................................ F16K 21/10
[52] U.S. Cl. ...................... 137/514.3; 137/529; 137/540; 137/543.17; 251/902
[58] Field of Search ........................... 137/529, 535, 137/540, 543.17, 514, 514.3; 251/902

[56]     References Cited

U.S. PATENT DOCUMENTS

| | | | |
|---|---|---|---|
| 1,886,205 | 11/1932 | Lyford | 137/543.17 |
| 2,208,690 | 7/1940 | Tydon | 137/543.17 |
| 2,840,107 | 6/1958 | Campbell | 137/540 |
| 2,888,034 | 5/1959 | Glegg | 137/512.4 |
| 3,063,461 | 11/1962 | Rudolph | 251/902 X |
| 3,336,942 | 8/1967 | Keith et al. | 137/543.17 X |
| 3,714,964 | 2/1973 | Livingston | 137/514 X |
| 3,845,876 | 11/1974 | Needhan et al. | 137/514 X |
| 3,943,969 | 3/1976 | Rubin et al. | 137/540 X |
| 4,061,157 | 12/1977 | Hanssen | 137/242 |
| 4,746,105 | 5/1988 | Allison | 251/902 X |
| 4,777,975 | 10/1988 | Strangefeld | 137/242 |
| 5,176,189 | 1/1993 | Perchthaler et al. | 141/98 |

FOREIGN PATENT DOCUMENTS

| | | | |
|---|---|---|---|
| 841303 | 5/1939 | France | 137/543.17 |
| 11371 | 12/1902 | Germany | 137/540 |
| 1650946 | 10/1970 | Germany | 137/543.17 |
| 3212949 | 10/1983 | Germany | 137/540 |

*Primary Examiner*—John Rivell
*Attorney, Agent, or Firm*—Hardie R. Barr

[57]     ABSTRACT

In a valve, the valve poppet member is constructed from a spring material where a tubular wall portion has a spiral wall configuration intermediate of a supporting base and a valve head. The spiral wall configuration has inner and outer diameters, a specific number of revolutions with a spiral width and a width of material remaining to provide sufficient cantilever strength to support the valve head and has the desired spring rate to seat the valve head on a valve seat.

2 Claims, 2 Drawing Sheets ns in the wall and
fluid can pass through and around the wall portion. The wall
FLEXURED SHAFT POPPET

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to a poppet configuration for automatic sealing operations in valves or couplings.

BACKGROUND OF THE INVENTION

Poppets are valve members and are commonly used for closing or seating on valve seat on a valve opening to prevent or to permit fluid flow through the valve opening.

Typically, the poppet has a cylindrically shaped stem disposed along a longitudinal axis and a larger diameter cylindrically shaped valve head. The valve head has a sealing surface such as a tapered edge which is adapted to sealingly engage a seating surface such as a tapered surface about a valve opening. In certain applications, a poppet is closed or moved to a closed condition by an independent spring member acting in one longitudinal direction on the body of the poppet and is opened or moved to an opened condition by a force such as an independent actuating member or fluid pressure acting in an opposite longitudinal direction on the poppet.

Where precise seating of a valve head with a seating surface about a valve opening is required, the stem is machined to a tight (small) tolerance with respect to a stem guide bore to maintain alignment of the sealing surfaces on the valve head and the valve opening while the poppet is slidably moved between an open and a closed condition. In certain instances, the fluids passing through the valve will contain contaminants or components which can build up as a residue on the sliding surfaces between the stem and the guide bore. Such residue can and does prevent the poppet from properly sealing. If the poppet fails to operate properly, in space operations for example, couplings can not be disconnected safely.

Where the poppet stem has a sliding surface in a bore, wear of the surfaces also occurs which can lead to contamination build-up and/or loose fits which affect the operation of the poppet.

PRIOR ART

U.S. Pat. No. 2,888,034 issued on May 26, 1859 to D. Glegg relates to a check valve where the poppet member 24 is a one piece element formed of rubber having a high density. The poppet member can be stretched and shortened to open a valve opening.

SUMMARY OF THE PRESENT INVENTION

In the present invention a tubular poppet stem or valve member is constructed from a spring material and the wall of the stem includes a longitudinal tubular wall section which has a spiral configuration which can be formed by a spiral cut in a tubular member. The tubular wall section and the spiral configurations are constructed and arranged to provide a radial, relatively stiff support along the longitudinal axis of the valve member yet permit the stem to have a spring action longitudinally of the axis of the stem. A sealing valve head on the stem is capable of flexing relative to the longitudinal axis by virtue of the flexible wall construction so that seating surfaces on the valve head and the valve opening can be self aligned. The outer diameter of the stem can be made less than the diameter of the guide bore so that sliding surfaces between a poppet stem and the guide bore are eliminated. The poppet valve member has a base portion for providing a cantilevered mounting of the wall section and the valve head. Ports are provided in the wall and fluid can pass through and around the wall portion. The wall portion is compressed to function as a spring to close the valve head on the seating surface.

In another form of the invention a check valve can utilize a poppet valve member with spiral spring walls disposed on either side of a valve head means where the spring in the wall portions is under compression so that the valve is normally closed. Differential pressure opens the valve and a dashport is provided on one of the spring walls to dampen the valve action.

DESCRIPTION OF THE DRAWINGS

In FIG. 2 the top half above the center line shows a closed poppet position while the lower half below the center line shows an open poppet position;

DESCRIPTION OF THE INVENTION

Figure 1:
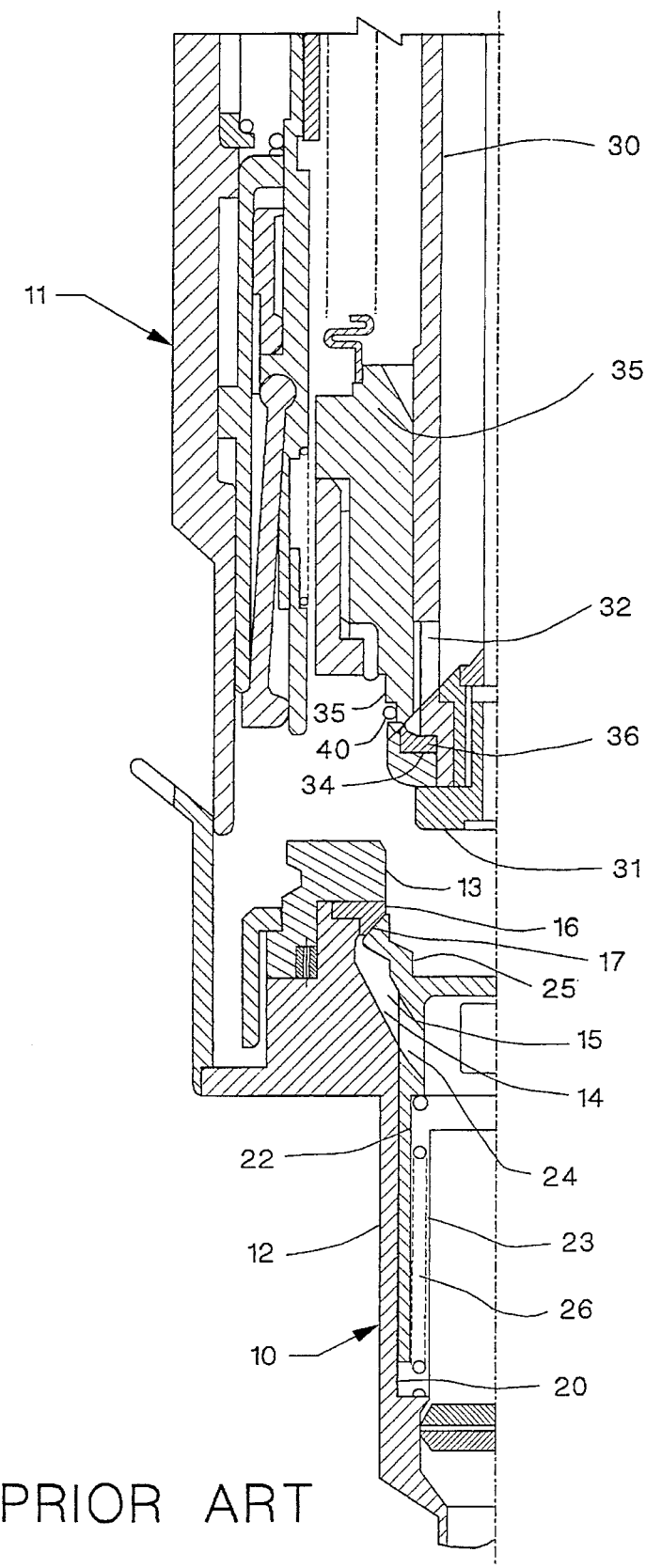
FIG. 1 is a prior art coupling shown in longitudinal cross-section to illustrate the background for the present invention.

Referring to FIG. 1, a coupling which is utilized in a Space Shuttle is illustrated. The coupling is comprised of two halves, which are sometimes referred to as an airborne (or flight) half coupling member 10 and a ground half coupling member 11. The coupling member 10 includes a tubular outer housing 12 which has an inner valve seat opening 13 which adjoins an annular recess 14 where the recess 14 forms one wall of a flow passage 15. A Teflon seal member 16 and beveled or tapered sealing surface 17 are at one end of the recess 14 and define valve sealing surfaces about the valve seat opening 13.

The housing 12 also has a poppet bore 20 which is machined to slidably receive a poppet member 22. The poppet member 22 has a cylindrical stem with an internal blind bore 23. The wall of the stem has ports 24 which couple the flow passage 15 to the bore 23. At the end of the stem is a poppet valve head 25 with a tapered edge sealing surface which seats on the sealing surface 17 about the valve opening 13. A spring 26 in the blind bore 23 acts on an end wall of the poppet member and on a shoulder in the housing 12 to normally move the poppet member to a closed sealing position where the valve head 25 engages the sealing surface 17.

The ground half of coupling 11 is arranged to couple with the airborne half coupling member 10 and includes a tubular probe member 30 with a closed end 31 and end ports 32 in the wall of the probe. The closed end 31 has an outer valve disposed over the ports 32 which includes a valve seat and seal 34 and a movable dynamic valve head 35 with a valve sealing seat 36 which has a tapered surface. On an outer surface of the valve head is an O-ring seal 40. The valve head 35 is arranged to be received sealingly in the opening 13 by virtue of the O-ring 40 while the poppet valve in the coupling 10 remains closed. After sealingly receiving the O-ring seal 40 on the end of the head 35, the dynamic valve head 35 is stopped by the coupling 10 and the probe 30 continues to move so that the valve seat and seal 34 are displaced from the valve head 35 while in the airborne half 10, the valve head 25 is displaced from the sealing surface 17. Thus, fluid can be transferred through the attached couplings.

With the forgoing arrangement, it can be seen that the poppet stem 22 and poppet bore 20 require close tolerances for a sliding fit and are susceptible to contaminate build-up.

Figure 2:
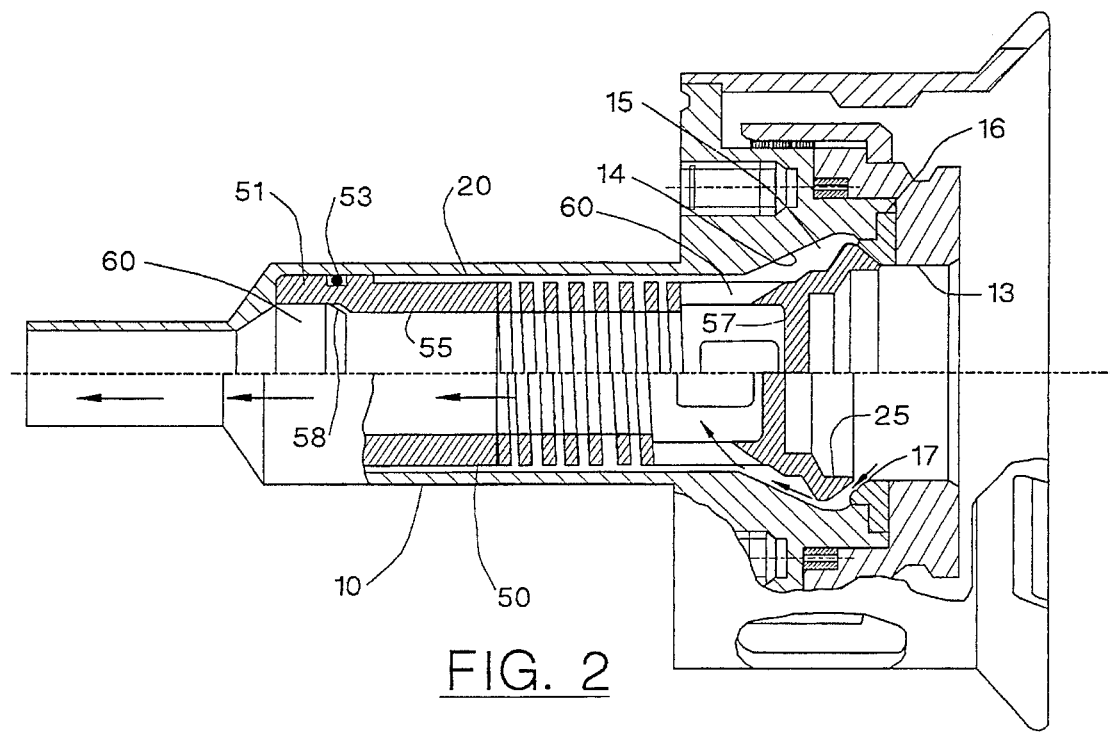
FIG. 2 is a view in longitudinal cross-section through a coupling similar to that of FIG. 1, but utilizing the present invention.

Referring now to FIG. 2, in the present invention a similar housing 10 can be utilized with the poppet configuration of the present invention. The housing 10 has a flow passage 15, a Teflon seal member 16 and beveled sealing surface 17 about the valve opening 13.

Figure 3:
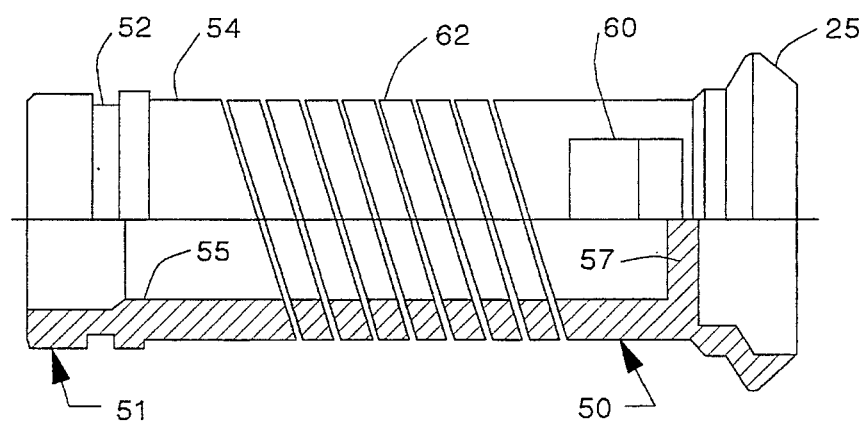
FIG. 3 is an illustration in partial cross-section of one form of a poppet embodying the present invention.

The housing 10 has a poppet bore 20 which receives a poppet 50. The poppet 50 (see also FIG. 3) includes a cylindrically shaped base and end portion 51 which has an O-ring groove 52 for receiving an O-ring 53. The base portion 51 adjoins a smaller diameter, recessed section 54. A blind bore 55 extends through the base portion 51 and the recessed section 54 to a transverse end wall 57 and defines an annular wall section. The annular wall section is provided with circumferentially spaced flow ports 60 in a location adjacent to the end wall 57 where the flow ports 60 access the flow passage 15 to the bore 55 in the poppet. The outer wall of the recessed section 54 is also spaced inwardly from the poppet bore 20. In the open end of the bore 55 is an annular recess 58 which receives a filter member 60. At the other end of the poppet 50 is a valve head 25 which has a tapered surface which seats on the sealing surface 17.

In the recessed section 54 of the poppet 50 and in a location between the flow ports 60 and the base portion 51, spiral cuts 62 are made through the wall of the poppet to define a spiral connecting portion or spiral configuration between the base portion 51 and the valve head 25 at the other end of the poppet. By making the poppet member from a spring material the cut defines a spring which has a radial stiffness and a spring rate. The preferred material for the intended application of this invention is Beta-C titanium per AMS 4958A because of inherently lower iron nitrate build up, compatibility with propellants, and relatively high material strength. The characteristics of the spring are defined by choice of poppet material and treatment; by specific inner and outer diameters, a specific number of revolutions of the cut, the width of the cut or spiral width and the width of the material remaining between the spiral cuts or spiral widths and the length of the cut in an axial direction. These parameters are utilized to provide sufficient cantilever strength to support the poppet sealing head 25 yet provide a flexure to provide for any seating misalignments. The base support 51 with the O-ring 53 adequately support the poppet so that the outer wall of the recessed section 54 has sufficient clearance to prevent or minimize residue build-up which causes poppet sticking.

The geometry of the spiral cut is utilized to provide an axial spring constant and the required radial stiffness. The radial stiffness is used to facilitate alignment of the sealing surfaces while the flexing capability and a conical slope on the poppet sealing surface will automatically align the poppet on the poppet seat.

The width of the spiral cut is sized to assure that contamination will not collect between the coils. This also permits fluid to flow in annular space between the poppet and the bore 20 and to sweep away any contamination and to prevent any build-up of contamination.

In operation, the device operates when an axial force from a probe in a ground half coupling overcomes the resisting compression force of the flexured wall spring to move the poppet to an open position. In the open state the sealing surfaces of the primary poppet seal and the poppet valve head are no longer engaged. The flow passages provide the primary conduit for fluid flow. The grooves or cuts in the flexured wall spring provide a secondary conduit. When probe is removed, the axial force from the flexured wall pushes the poppet's sealing valve head against the primary poppet seal to contain the fluid. The poppet is primarily supported by the base support 51 with the O-ring being tightly fit inside the housing. In the open position of the valve, the probe also provides some radial support for the poppet through it's contact. In the closed position the poppet receives some radial support by engagement of the poppet sealing surface with the poppet seat.

From the foregoing description, it should be apparent that since there are no sliding surfaces, the poppet is not susceptible to leaking due to residue build-up and subsequent jamming of the poppet in an open position. It will also not generate any particulate matter.

Figure 4:
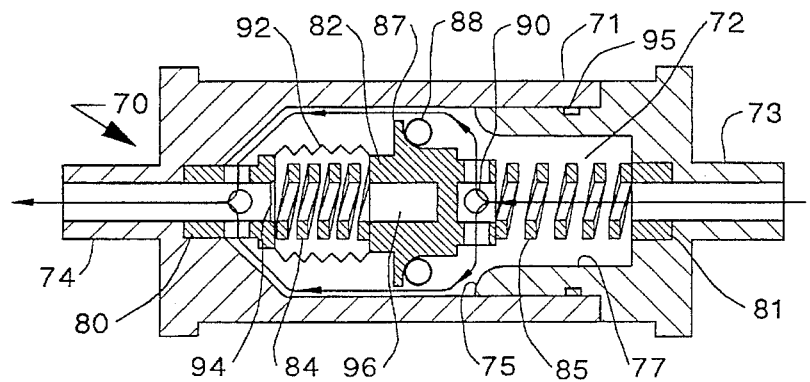
FIG. 4 is an illustration in cross-section of another form of a poppet embodying the present invention and applied to a check valve.

Referring now to FIG. 4, utilization of the present invention in a check valve 70 is illustrated. The check valve includes a housing 71 with a hollow interior 72 and inlet pipe 73 and an outlet pipe 74. In the interior 72 is a valve seat 75 disposed about the end of a bore 77. The housing 71 is constructed from two tubular elements which respectively have bores to receive the tubular ends 80, 81 of a poppet member 82.

A poppet member 82 disposed in the interior 72 has tubular flexured spiral connecting spring walls 84, 85 which connect the ends 80, 81 of the poppet to a central poppet head 87. The poppet head 87 is cylindrically shaped and carries an O-ring member 88 which can seatingly seat on the valve seat 75 in one axial position and can be displaced axially as shown in FIG. 4 to permit through flow from the inlet pipe 73 to the outlet pipe 74.

The flexured connecting spring walls 84, 85 support and guide the poppet valve head 87. The flexured connecting spring walls of the poppet are essentially helical springs with square or rectangular cross sections to provide sufficient radial stiffness to center the poppet valve head 87 while providing the appropriate axial reaction forces to allow the poppet to operate at the correct inlet-outlet differential pressure. The poppet valve head and connecting spring walls are manufactured from continuous piece of material with the walls controlled to specific internal and external diameters. Spiral cuts are made in the wall to provide continuous circumferential grooves completely through the walls. The grooves run for specified lengths along the walls while making a specified number of revolutions around the circumference. The type of material, the width of the cut, the internal and external diameters, the width of material remaining between the spiral grooves, and the length of the cut along the walls controls the radially stiffness and spring rate of the flexured spring wall.

The flexured wall outside diameters are sized for adequate radial clearance (e.g. 0.050") to prevent both wear and contamination build up problems. For example, nitrogen tetroxide with iron nitrate build up can be controlled if the poppet is made of a material (e.g. Beta-C or 6A1-4V titanium) which is not as susceptible to residue buildup (since titanium doesn't contain iron). The ends of each wall furthest from the poppet are intended to be supported in the housing by close tolerance fits, and thus the outside diameter at the ends might vary from the outside diameter of the flexured portions. Although not shown, a replaceable elastic material could be used on the ends of the walls (e.g., O-ring) with appropriate alterations (e.g., O-ring glands) to facilitate assembly and disassembly operations.

The spiral grooves make the poppet walls function as springs while providing sufficient radial stiffness. The geometry of the spiral cut as described above is designed to provide the axial spring rate and radial stiffness required for the application. Radial stiffness is used to center the poppet to facilitate alignment of the sealing surfaces between poppet, housing and seal. The floating poppet seal, the flexing capability of the flexured wall, and the convex-concave shape of the seat and poppet sealing surfaces assures alignment for proper sealing. The valve seat 75 is formed from the inlet housing.

The width of the spiral grooves in the most compressed states are sized (e.g., 0.030 inches) to assure contamination will not collect between coils and prevent the poppet from opening and closing. The primary flow path on the inlet side of the poppet is from the internal diameter of the poppet wall, through the multiple channels 90 bored radially into the wall, around the poppet valve head 87, and across the poppet. This design also allows some fluid to flow through the spiral grooves and outside the flexured wall prior to the poppet seal to help sweep away contamination thereby preventing contamination (generated upstream of the invention) from building up in the grooves and external diameter of the wall. Flow rate is intentionally limited through the grooves to prevent instabilities due to phenomena like vortex shedding.

A bellows 92 and flow restrictor 94 on the outlet wall 84 function together as a damper to control chatter. The damping coefficient required for the specific application is sized by the geometry of the bellows (e.g., internal volume and length), the internal volume of the poppet 96, and the flow restriction. The flow restrictor could be either a conventional orifice or a porous metal disk. To prevent contamination from blocking the flow restrictor, the porous metal disk would be the preferred choice. While the primary function of the bellows is to isolate the internal fluid from the external fluid, the bellows does provide a degree of radial support and axial spring force. The bellows can be attached to the wall by either welding or brazing. The flow restrictor can be attached to the wall by an interference fit.

The valve head is normally held in a closed position by the installed axial preload of the poppet's inlet and outlet flexured spring walls which are each under a compressive load (although not necessarily the same). In the closed position, the inlet and outlet 73, 74 of the valve head are isolated by the seal 88. When inlet fluid pressure raises sufficiently above outlet pressure to create a differential pressure force across the poppet valve head 87 to overcome the opposing axial force of the flexured spring walls, the poppet valve head 87 will begin moving to the open position. As the poppet valve head 87 begins to open, the bellows 92 is compressed and fluid contained in the internal volume of the bellows will begin to flow through the flow restrictor 94 and into the outlet port 74. Since the fluid flow requires a specific amount of time, the bellows is restricted from compressing and thus opposes the opening movement of the valve head, providing a damping force to control chatter. The poppet valve head 87 will continue to move in the open direction until an equilibrium is established. In the open state, the fluid media flows from the inlet 73 to the outlet 74 since the sealing surfaces of the poppet/seat and poppet seal are no longer engaged. The multiple channels in the poppet wall 90 provide the primary conduct through which fluid flows between the inlet and outlet. The grooves in the inlet flexured wall provide a secondary flow path.

When the differential pressure is not sufficient to sustain the poppet valve head in the open position, the poppet valve head will begin to move to the closed position. As the poppet valve head begins to close, the bellows 92 is extended and fluid will begin to flow from the outlet port 74 through the flow restrictor 94 in the reverse direction and into the internal volume of the bellows. Since the fluid flow requires a specific amount of time, the bellows 92 is restricted from extending and thus opposes the poppet valve heads closing movement, providing a damping force to control chatter. The poppet valve head will continue to move in the closed direction until either a new equilibrium is established or the poppet valve head closes. When the poppet valve head fully closes, the axial force from the flexured spring wall engages the sealing surfaces to isolate the outlet port 74 from the inlet port 73. When outlet fluid pressure exceeds inlet fluid pressure, the sealing force of the flexured walls is enhanced by extra loading on the O-ring 88.

The inlet and outlet housings either contain a threaded connection and seal 95 for disassembly or (not shown) are welded together for permanent assembly. In either case the seal or the weld would prevent the fluid media from leaking into the environment.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. In a valve utilizing a reciprocating poppet valve member, a valve housing having a hollow interior and an inlet and an outlet to said hollow interior;

said housing having a valve seat located about a flow opening in said hollow interior;

a poppet valve member disposed in said hollow interior, said poppet valve member being elongated along a longitudinal axis and having a valve head means, said valve head means being compatible with said valve seat for sealing engagement in a first longitudinal position to close said opening and permitting flow through said flow opening when moved to a second longitudinal position;

said poppet valve member having spiral wall portions located along its longitudinal length in a tubular configuration between base end walls and a valve head means where said base end walls are respectively located long a central axis for said housing and are disposed on either side of the valve head means, each of the spiral wall portions being constructed from a spring material to cause a spiral wall portion to have a spring function, said base end walls being located in the hollow interior of the housing so as to place the spiral wall portions in sufficient compression to maintain the valve head means in sealing engagement with the valve seat and arranged to permit displacement of said valve head means from said sealing engagement in response to a differential pressure across the valve head means;

said spiral wall portions each having a tubular section with ports therein for permitting fluid flow and said spiral wall portions having inner and outer diameters with a specific number of spiral revolutions with a spiral width and a width of material remaining to provide sufficient cantilever strength to support the valve head means when the valve head means is disposed from sealing engagement with the flow opening, and bellows disposed over one of the spiral wall portions to define a bellows chamber and a flow restrictor disposed in an opening to the bellows to meter flow into and out of the bellows thereby to dampen the longitudinal motion of the valve head means.

2. The valve as set forth in claim 1 wherein the valve head means is an O-ring for engaging the valve seat.

* * * * *